United States Patent Office 3,194,762
Patented July 13, 1965

3,194,762
EXTREME PRESSURE LUBRICANT AND METHOD FOR MAKING THE SAME
Charles A. Browning, Chicago, and Walter L. Walz, Park Forest, Ill., assignors to International Harvester Company, Chicago, Ill., a corporation of New Jersey
No Drawing. Filed June 12, 1961, Ser. No. 116,262
3 Claims. (Cl. 252—51.5)

This invention relates to extreme pressure lubricants such as that required for certain types of gears and the like. More in particular this invention relates to extreme pressure lubricants and process for making same wherein the extreme pressure lubricant agent is in the form of a finely divided substantially oil-insoluble plastic having lubricant properties suspended in a liquid lubricating media such as oil.

Various types of extreme pressure agents have been added to oil to form a solid substance or grease with considerable success although proportionately large percentages of the extreme pressure agent are usually required. For example, finely divided particles of graphite have been suspended in oil to improve the extreme pressure characteristics thereof. This indicates that graphite itself is a lubricant and though insoluble its structure is of crystalline nature. However particularly with reference to gear lubricants where the unit area contact pressure is high, such lubricants do not withstand these high pressures for satisfactory long periods. In the case of gears the first sign of lubricant failure is that "pitting" occurs on the teeth. Later, portions of the teeth begin to break off and sometimes full teeth break off at the roots thereof. Such large metal particles can of course be the cause of severe damage if they become engaged between meshed gears.

Accordingly, it is a prime object of this invention to provide a superior extreme pressure lubricant composition characterized by the addition of an oil-insoluble ductile plastic powder in suspension in a liquid lubricant media.

A further object of this invention is to provide a superior extreme pressure liquid lubricant composition characterized by the addition of an oil-insoluble ductile plastic powder of extremely fine particle size suspended in a liquid lubricant media.

A still further important object of this invention is to provide a method of preparing a lubricant composition according to the preceding objects.

A yet further important object of this invention is to provide a lubricant composition according to the preceding objects wherein a method is provided for converting the plastic into an extremely fine particle size including the incorporation of the powder in the liquid lubricant media.

These and other important objects encompassed by the invention will become apparent from the ensuing description and appended claims.

It was found that certain types of oil-insoluble plastic powders exhibited lubricating characteristics and particularly when such powders were incorporated into conventional lubricating oils exhibited remarkably good resistance to extreme pressures and substantially greater than that for other known insoluble powders such as graphite. It is believed that the improved resistance to extreme pressures is due to the pliability of the plastic particles without rupture under extreme pressures in contrast with the inability to withstand rupture under such pressures of known insoluble materials such as graphite which is of hexagonal crystalline structure.

Several commercially available oil-insoluble plastic materials of the thermoplastic type have been found which when added to conventional liquid lubricating oils, such as petroleum derived lubricating oils, produced lubricant compositions having excellent resistance to extreme pressures such as those pressures occurring on contact surfaces of meshed gears. Nylon plastic powders, for example, are excellent for such purposes. For example, nylon resins described in numerous United States patents (e.g., U.S. Patent #2,071,250 to W. H. Carothers) which are available commercially and known as "Zytel" (trademark owned by E. I. du Pont de Nemours & Company) are excellent when employed in accordance with the present invention. Other types of nylon resins (e.g., types 6 and 11) satisfactory for use in the present invention are commercially available and further described in "Modern Plastics Encyclopedia," published by Modern Plastics Magazine, as is well known to those skilled in the art.

Resins of the type commercially available as "Delrin" (trademark owned by E. I. du Pont de Nemours & Company) have been found satisfactory when used according to this invention. These resins are believed to be of the acetal polyoxymethylene type described in U.S. Patent #2,768,994 to R. N. MacDonald. In addition, resins commercially available as "Teflon" (trademark owned by E. I. du Pont de Nemours & Company) are satisfactory for use in the practice of this invention. These latter resins are believed to be of the polytetrafluoroethylene type described in U.S. Patent #2,230,654 to R. J. Plunkett.

Particle size of the resin for use in making liquid lubricating compositions according to this invention is highly critical for if they are too large they separate from the oil media and settle to the bottom of the container. This is, of course, undesirable for when the gear machinery is shut down the particles settle to the bottom of the lubricant reservoir. Then subsequently when re-started there may be little or no plastic particles at the engaging faces of the gear teeth. Thus, it is essential that the particles remain in suspended state in the oil. Plastic particle size from about 270 mesh (300 microns) maximum and finer were tested for their ability to remain suspended in oil but it was found that when the particle size was larger than about 10 microns suspension in oil was unstable. Particles of up to about 10 microns, maximum, size was found to remain in suspension in petroleum oil for two weeks at 180° F., without indication of settling out. Particle size of 2 to 5 microns range was found to be most preferable.

Larger particle size, 100 microns or less, are satisfactory for making extreme pressure resistant grease lubricants consisting of oil and powdered resin according to this invention because of the semi-solid paste-like consistency of grease, suspension of the particles presents no difficult problem. However, for liquid type extreme pressure lubricant compositions the customary methods for introducing finely divided plastic powder particles of about 2 microns in size into petroleum oil produced unsatisfactory results. The particles agglomerated in the oil, some of which settle to the bottom and others, probably due to entrapped air, floated on the surface which resembled scum. An important feature of this invention is a novel method of preparing a composition of oil having finely divided (2 to 10 microns or larger if desired) plastic powder particles without encountering the aforesaid difficulty and yet remain in stable suspension resembling in some respects that of a colloidal suspension.

In order to illustrate the invention several compositions consisting of a petroleum derived oil with various oil-insoluble powdered resins were prepared as below described.

In all of the specific examples of the invention described the lubricant base oil selected was a conventionally known petroleum oil commercially obtainable which met the following general specifications:

| | | |
|---|---|---|
| S.A.E. No. | 50 | |
| Flash Point—open cup | 450° F. | ASTM [1] D-92. |
| Viscosity—Saybolt 210° F. | 85-110 Sec. | ASTM [1] D-88. |
| Pour Point | 25° F. Max. | ASTM [1] D-97. |
| Color No. | 6 Max. | ASTM [1] D-155. |
| Carbon Residue (Conradson) | 1.0 Max. | ASTM [1] D-189. |
| Viscosity Index | 80 Min. | ASTM [1] D-567. |

[1] American Society For Testing Materials.

As mentioned above when finely divided plastic powder particles (1-10 microns) are added directly to the base oil to form a liquid composition, the particles tend to agglomerate into larger masses which either settle to the bottom or float on the surface of the oil. In order to circumvent this difficulty a novel method for introducing the oil-insoluble plastic into the base oil forming a stable suspension was developed. Example 1 below illustrates this method.

EXAMPLE 1

One gram of oil-insoluble nylon powder type 66 (Zytel 101) is mixed with one gram of a liquid dispersing agent and 98 grams of ethylene glycol. A satisfactory dispersing agent is Ethomeen 5/15 * which is understood to be a tertiary aliphatic amine. The mixture is heated in a container, such as an Erlenmeyer flask to boiling until the nylon dissolves or until all visible aggregates are no longer apparent. This may require about 40 minutes.

A conventional Waring Blendor containing about 300 ml. of isopropanol is set into operation at high speed and while thus operating the above described hot mixture is added slowly into the isopropanol over a period of about two minutes. The blender is maintained in operation for at least about one minute after all of the above described hot mixture has been added to the isopropanol. During this operation the nylon precipitates into finely divided particles in the resulting mass.

Transfer the resulting isopropanol mixture into centrifuge tubes and conventionally centrifuge to separate the nylon particles which operation may require as long as twenty minutes or more. Approximately 60% of the contents in the centrifuge tubes will be clear liquid. The supernatant liquid is removed by conventional methods such as by siphoning or vacuum. Fresh isopropanol is then added to the centrifuge tubes containing the precipitated nylon and vigorously shaken to redisperse and wash the particles and again centrifuged for about 15 minutes. Again as before the supernatant liquid is removed. The washing operation is repeated for a total of six washings.

The mass thus obtained consists of finely divided nylon particles of 2-5 micron size with some isopropanol. The mass is then transferred to 190 ml. of base oil using a little benzene if necessary to rinse the solid nylon particles from the centrifuge tubes. Stir the resulting mixture on a hot plate (magnetic stirrer hot plate preferred) to remove the isopropanol and benzene in a stream of air until all of the alcohol and benzene are removed. The resulting mixture is a concentrate of nylon particles of 2-5 micron size in base oil in proportion of 20 grams of nylon per gallon of base oil. The specific gravity of the base oil used was 0.8990.

The liquid concentrate thus obtained was found to be a stable suspension even at a temperature of 180° F. for a period of two weeks.

* Trademark owned by Armour Chemical Division, Armour & Co., Chicago, Ill.

In the foregoing example it was stated that the liquid concentrate in each batch made consisted of 1 gram of nylon powder of 2-5 micron particle size suspended in 190 ml. of base oil. The viscosity of such a suspension is materially affected by the proportions of nylon powder to base oil as shown in the following tables:

Table 1

| Composition: | Average viscosity seconds—Saybolt |
|---|---|
| Base oil | 94 |
| 1 gram nylon and 1 qt. base oil | 100 |
| 2 grams nylon and 1 qt. base oil | 107 |
| 3 grams nylon and 1 qt. base oil | 127 |
| 4 grams nylon and 1 qt. base oil | 160 |

Table 2.—Fluidity at room temperature

| | |
|---|---|
| 1 gram nylon and 5 grams base oil | Semi-heavy grease. |
| 1 gram nylon and 10 grams base oil | Do. |
| 1 gram nylon and 20 grams base oil | Do. |
| 1 gram nylon and 25 grams base oil | Do. |
| 1 gram nylon and 30 grams base oil | Semi-fluid grease. |
| 1 gram nylon and 40 grams base oil | Do. |
| 1 gram nylon and 55 grams base oil | Do. |
| 1 gram nylon and 70 grams base oil | Do. |
| 1 gram nylon and 75 grams base oil | Viscous liquid. |

Of course, as may well be expected, compositions employing other base oils of different viscosities would possess ultimate viscosities correspondingly different from that shown in Tables 1 and 2. In addition, the base oil may be other than petroleum derived oils such as animal and vegetable oils having lubricating properties.

EXAMPLE 2

A lubricant composition was made in accordance with the procedure of Example 1 wherein the plastic was nylon type 6 and the composition consisted of 0.8 percent by weight of nylon, the balance being base oil.

EXAMPLE 3

Same as Example 2 except nylon type 11 was used in the amount of 1.75 percent by weight.

EXAMPLE 4

Teflon type 6 was used in the amount of 0.35 percent by weight added directly to the oil with agitation.

EXAMPLE 5

Teflon type 7 was used in the amount of 0.5 percent by weight added directly to the oil with agitation.

For purposes of comparative evaluation by testing of the extreme pressure lubricants made in accordance with the preceding examples, the following two examples represent lubricants using the same base oil as above but adding conventionally known extreme pressure additives. Each of these two compositions were made using the amounts of the additives suggested by the manufacturers thereof.

EXAMPLE 6

Two percent by weight of an oil dispersion of graphite was added to the base oil.

EXAMPLE 7

Two percent by weight of an oil dispersion of molybdenum disulfite was added to the base oil.

In comparative evaluation of extreme pressure lubricants by testing, the above described liquid lubricants were tested in accordance with the well known 4-square dynamometer method mentioned on page 708 of the "Transactions of the American Society for Metals," volume 28, No. 3, September, 1940. The test results are shown in Table 3 below.

*Table 3.—4-Square Dynamometer Test*

| Composition | Cycles [1] | Remarks |
| --- | --- | --- |
| Base oil | 2,400,000 | Severe pitting, chipping and wear. |
| Example 2 | 5,500,000 | No pitting at 5 million cycles—slight pitting at 5.5 million cycles. |
| Example 3 | 7,750,000 | No pitting at 6 million cycles—slight pitting at 7.75 million cycles. |
| Example 6 | 3,600,000 | Moderate pitting. |
| Example 7 | 4,700,000 | Slight pitting. |

[1] Pinion cycles at 47,850 p.s.i. bending stress and contact pressure of 310,000 p.s.i.

A similar type of testing as that of the above, known as the 6 Pitch Test wherein the pinion was under a 50,000 p.s.i. bending stress and 270,000 p.s.i. contact stress was also performed as noted in Table 4 below. The 6 Pitch Test is less severe than that of the 4-Square Dynamometer method.

*Table 4*

| Composition | Cycles | Remarks |
| --- | --- | --- |
| Base oil | 5,000,000 | Moderate pitting. |
| Example 5 | 17,900,000 | Slight pitting. No pitting at 14 million cycles. |

From the above it can readily be seen that the addition of a small amount of oil-insoluble thermoplastic resins of the ductile type to a conventional base oil improves its extreme pressure properties vastly over the base oil alone and far superior to conventionally known additives.

A microscopic examination of the lubricants made in accordance with Examples 1–5 inclusive after testing as above noted indicated that the plastic particles become thin flat platelets. From this it is apparent that the plastic is not only a good lubricant but also highly ductile or pliable without rupture. Thus the film strength of these plastic platelets is extremely high. Further it was noted that after shut-down of the test apparatus these plastic platelets adhered to the gear teeth so that upon re-start the protective particles immediately functioned. In addition there was no evidence found tending to show that the platelets agglomerated as no sediment or scum formed.

In the case of lubricants made under Examples 6 and 7 it is believed that the particles rupture under the extreme pressures thus grinding them into smaller particles, and when they become too small they apparently cease to function efficiently.

Having thus described preferred embodiments of the invention it can be seen that the objects of the invention have been fully achieved and it must be understood that changes and modifications may be made which do not depart from the spirit of the invention nor from the scope thereof as defined in the appended claims.

What is claimed is:

1. A method of preparing an extreme pressure lubricating composition consisting of the steps of dissolving a ductile thermoplastic resin selected from the group consisting of nylon, acetal polyoxymethylene and polytetrafluoroethylene, with a dispersing agent in a minor portion of a first liquid organic solvent, vigorously agitating a major portion of a second liquid organic solvent, said second solvent being miscible with said first solvent and immiscible with said resin, adding said solution slowly to said vigorously agitating second solvent to precipitate said resin in particle form of 1 to 10 microns size, extracting substantially all of said first solvent and a major portion of said second solvent from the resulting first mixture, adding the resulting mass thus obtained to a lubricant natural base oil with agitation forming a second mixture, evaporating substantially all of said second solvent from said second mixture thereby forming an extreme pressure lubricant composition consisting essentially of said resin particles stably suspended in said base oil.

2. A method of preparing an extreme pressure lubricating composition consisting of the steps of heating a mixture consisting essentially of proportionately 98 grams of ethylene glycol solvent with about 1 gram of a liquid dispersing agent and about 1 gram of nylon plastic resin to form a solution, vigorously agitating at least about 350 ml. of isopropanol solvent for each 100 grams of said solution, adding said heated solution slowly to said agitating isopropanol to precipitate said nylon in particle form of 1 to 10 microns size, removing a major proportion of said solvents from the resulting mixture, washing the resulting mass with isopropanol solvent until substantially all of said ethylene glycol and said dispersing agent are removed, redisperse said washed mass in isopropanol to form a second mixture, adding said second mixture to a natural base oil with agitation, and thereafter heating the resulting mass to evaporate said isopropanol thereby forming an extreme pressure lubricant consisting essentially of nylon particles of 1 to 10 microns size stably suspended in said base oil.

3. The residue product, a liquid extreme pressure lubricating composition prepared from:
 - a first liquid organic solvent, said solvent being extractable;
 - a ductile thermoplastic resin selected from the group consisting of nylon, acetal polyoxymethylene, and polytetrafluoroethylene, said resin being dissolved in said first solvent;
 - a second liquid organic solvent, said second solvent being miscible with said first solvent and immiscible with said resin, and precipitating the said resin in particles of a size of approximately 1 to 10 microns; and
 - a natural base lubricating oil, said product being the residue following removal of said first and second solvents whereby there remains a final residue product consisting essentially of said lubricating oil and a minor proportion of stably suspended thermoplastic resin particles sufficient in amount to impart an extreme pressure lubricating property to said lubricating composition.

References Cited by the Examiner

UNITED STATES PATENTS

| | | | |
| --- | --- | --- | --- |
| 2,291,166 | 7/42 | Maag | 252—58 |
| 2,298,833 | 10/42 | Muessig | 252—58 |
| 2,342,387 | 2/44 | Catlin | 260—34.2 XR |
| 2,510,112 | 6/50 | Holbrook | 252—58 XR |
| 2,576,837 | 11/51 | Irwin | 252—58 |
| 2,592,616 | 4/52 | Stott et al. | 260—34.2 XR |
| 2,644,802 | 7/53 | Lontz | 252—58 XR |
| 2,685,707 | 8/54 | Llewellyn et al. | 252—58 XR |
| 2,975,128 | 3/61 | Stott | 252—58 XR |
| 3,011,975 | 12/61 | Nitzsche et al. | 252—58 XR |
| 3,069,387 | 12/62 | Allen et al. | 252—58 XR |

FOREIGN PATENTS

| | | |
| --- | --- | --- |
| 1,085,282 | 7/60 | Germany. |
| 664,546 | 1/52 | Great Britain. |
| 761,965 | 11/56 | Great Britain. |
| 832,163 | 4/60 | Great Britain. |

DANIEL E. WYMAN, *Primary Examiner.*

JULIUS GREENWALD, *Examiner.*